United States Patent
Caren et al.

(10) Patent No.: US 6,872,359 B2
(45) Date of Patent: Mar. 29, 2005

(54) PRESSURE VARIATION IN ARRAY FABRICATION

(75) Inventors: Michael P. Caren, Palo Alto, CA (US); Peter G. Webb, Menlo Park, CA (US); Carol T. Schembri, San Mateo, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/691,223

(22) Filed: Oct. 21, 2003

(65) Prior Publication Data

US 2004/0086928 A1 May 6, 2004

Related U.S. Application Data

(62) Division of application No. 09/703,303, filed on Oct. 31, 2000, now Pat. No. 6,656,740.

(51) Int. Cl.[7] .................................................. B01L 3/02
(52) U.S. Cl. ........................................ 422/63; 422/100
(58) Field of Search ............................... 436/180, 164, 436/172, 94, 54; 422/100, 101, 63; 73/864.01, 864.11; 141/4–8

(56) References Cited

U.S. PATENT DOCUMENTS

| | | | | |
|---|---|---|---|---|
| 4,877,745 A | * | 10/1989 | Hayes et al. | 436/164 |
| 5,837,858 A | * | 11/1998 | Brennan | 536/25.3 |
| 6,019,457 A | * | 2/2000 | Silverbrook | 347/65 |
| 6,312,960 B1 | * | 11/2001 | Balch et al. | 436/518 |
| 6,372,483 B2 | * | 4/2002 | Schleifer et al. | 435/287.1 |
| 2002/0064482 A1 | * | 5/2002 | Tisone et al. | 422/100 |
| 2002/0106812 A1 | * | 8/2002 | Fisher | 436/180 |
| 2002/0122748 A1 | * | 9/2002 | Hirota et al. | 422/100 |

* cited by examiner

*Primary Examiner*—Jeffrey R. Snay
(74) *Attorney, Agent, or Firm*—Gordon M. Stewart (57) ABSTRACT

A method, apparatus and computer program product, for fabricating an array of biopolymers on a substrate. The method uses a biopolymer or biomonomer fluid and a drop dispenser having a chamber into which the fluid is loaded and an orifice communicating with the chamber from which the fluid is dispensed. The method includes, when the chamber is loaded, applying a prime pressure to the fluid which varies over a range sufficient to move fluid within the drop dispenser but insufficient to cause fluid to be dispensed from the orifice. Drops are dispensed from the dispenser to the substrate so as to form the array.

20 Claims, 3 Drawing Sheets

PRESSURE VARIATION IN ARRAY FABRICATION

This is a Divisional of application Ser. No. 09/703,303, filed on Oct. 31, 2000, now U.S. Pat. No. 6,656,740, the entire disclosure of which is incorporated herein by reference.

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Polynucleotide arrays (such as DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. The arrays, when exposed to a sample, will exhibit an observed binding pattern. This binding pattern can be detected upon interrogating the array. For example all polynucleotide targets (for example, DNA) in the sample can be labeled with a suitable label (such as a fluorescent compound), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers (such as from synthesis or natural sources) onto a substrate, or by in situ synthesis methods. Methods of depositing obtained biopolymers include loading then touching a pin or capillary to a surface, such as described in U.S. Pat. No. 5,807,522 or deposition by firing from a pulse jet such as an inkjet head, previously loaded with a biopolymer containing fluid, such as described in PCT publications WO 95/25116 and WO 98/41531, and elsewhere. For in situ fabrication methods, multiple different reagent droplets are deposited at a given target location in order to form the final feature (hence a probe of the feature is synthesized on the array substrate). The in situ fabrication methods include those described in U.S. Pat. No. 5,449,754 for synthesizing peptide arrays, and described in WO 98/41531 and the references cited therein for polynucleotides. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in a known manner. Reagents (nucleoside) in step (a) may be deposited as individual drops using any of the techniques previously described, while reagents for the remainder of the steps may be exposed to (flooded over) the entire substrate.

The foregoing chemistry of the synthesis of polynucleotides is described in detail, for example, in Caruthers, Science 230: 281–285, 1985; Itakura et al., Ann. Rev. Biochem. 53: 323–356; Hunkapillar et al., Nature 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007–1017, 1992. In the case of array fabrication, different monomers may be deposited at different addresses on the substrate during any one iteration so that the different features of the completed array will have different desired biopolymer sequences. One or more intermediate further steps may be required in each iteration, such as the conventional oxidation and washing steps in the case of in situ fabrication of polynucleotide arrays.

In array fabrication, the quantities of polynucleotide available, whether by deposition of previously obtained polynucleotides or by in situ synthesis, are usually very small and expensive. Additionally, sample quantities available for testing are usually also very small and it is therefore desirable to simultaneously test the same sample against a large number of different probes on an array. These conditions require use of arrays with large numbers of very small, closely spaced features. It is important in such arrays that features actually be present, that they are put down accurately in the desired target pattern, are of the correct size, and that the DNA is uniformly coated within the feature. If any of these conditions are not met within a reasonable tolerance, and the array user is not aware of deviations outside such tolerance, the results obtained from a given array may be unreliable and misleading. This of course can have serious consequences to diagnostic, screening, gene expression analysis or other purposes for which the array is being used. The present invention recognizes that when pulse jet or other drop deposition devices are used, one problem which can arise is the presence of gas bubbles in the fluid already loaded into the dispenser. Such bubbles can inhibit proper priming of the jet, causing it to misfire or not fire at all. Additionally, bubbles of varying size and quantity can be present in ejected drops resulting in non-uniform features.

It would be desirable then to provide a relatively simple means by which bubbles present in a drop dispenser during array fabrication, can be readily removed.

SUMMARY OF THE INVENTION

The present invention then, provides a method of fabricating an array of biopolymers on a substrate using a biopolymer or biomonomer fluid (such as a nucleic acid, for example DNA) and a drop dispenser. The drop dispenser has a chamber into which the fluid is loaded and an orifice communicating with the chamber and from which fluid is dispensed. The method includes when the chamber is loaded with a fluid, applying a prime pressure to the fluid which varies over a range sufficient to move fluid within the drop dispenser but insufficient to cause fluid to be dispensed from the orifice. Drops are dispensed from the dispenser to the substrate so as to form the array.

The varying prime pressure may be cycled at least once (and typically multiple times) between higher and lower pressures (as measured relative to each other). The duration of a cycle may vary, and may for example be between 0.01 to 5 seconds, or between 0.1 to 1 seconds. In one aspect, the varying prime pressure reaches a value during a cycle which is greater (or less) than ambient pressure outside the orifice. However, the prime pressure could be varied over a range which is both greater and less than the ambient pressure outside the orifice. The drop dispenser may be of various constructions. For example, a drop dispensing jet may include the chamber and an ejector (such as a piezoelectric or thermal ejector) which, when activated (typically electrically), causes a droplet to be ejected from the orifice. In any drop dispenser, the orifice may have an area, for example, of between 1 $\mu m^2$ to 3 $mm^2$ (or between 30 $\mu m^2$ to 900 $\mu m^2$), and a capacity of the chamber in the range of between 1 pL to 10 nL.

The method may optionally additionally include loading the dispenser by positioning the orifice adjacent and facing a biomonomer or biopolymer containing fluid, and providing a load pressure to the chamber which is sufficient such that the fluid is drawn into the chamber through the orifice. The dispenser may then be positioned with the orifice facing the substrate. Multiple drops may be dispensed from the head so as to form an array of droplets on the substrate. In this case, the varying prime pressure will typically be applied following the loading and prior to the dispensing.

The present invention further provides an apparatus having a substrate station on which the substrate can be mounted. The apparatus may further include a drop dispenser having and a pressure source to apply a varying prime pressure, each as already described. The pressure source may be constructed so as to automatically apply the varying prime pressure. A load station may be present to receive at least one fluid sample for loading into the dispenser, and a transport system can selectively position the head facing any one of the stations. The pressure source may also be capable of providing the load pressure. A processor may be provided as a component of the apparatus. The processor directs the transport system to selectively position the head facing the load station or substrate station, and directs the pressure source to provide the load pressure when the head is facing the load station and to provide the varying prime pressure after the head has been loaded.

A computer program product comprising a computer readable storage medium carrying computer readable program code, for use with an apparatus of the present invention, is further provided. The program code when loaded into a computer of the apparatus causes the apparatus to carry out the steps of a method of the present invention. For example, this may include applying the varying prime pressure and dispensing drops.

The various aspects of the present invention can provide any one or more of the following and/or other useful benefits. For example, any required priming of the dispenser can be efficiently and simply accomplished, or gas bubbles in the loaded dispenser removed.

BRIEF DESCRIPTION OF THE DRAWINGS

To facilitate understanding, identical reference numerals have been used, where practical, to designate identical elements that are common to the figures.

DETAILED DESCRIPTION OF EMBODIMENTS OF THE INVENTION

In the present application, unless a contrary intention appears, the following terms refer to the indicated characteristics. A "biopolymer" is a polymer of one or more types of repeating units. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, and oligonucleotides, as well as PNA and other polynucleotides such as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A "peptide" is used to refer to an amino acid multimer of any length (for example, more than 10, 10 to 100, or more amino acid units). A biomonomer fluid or biopolymer fluid reference a liquid containing either a biomonomer or biopolymer, respectively (typically in solution).

An "array", unless a contrary intention appears, includes any one, two or three dimensional arrangement of addressable regions bearing a particular chemical moiety to moieties (for example, biopolymers such as polynucleotide sequences) associated with that region. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). An "array layout" refers collectively to one or more characteristics of the features, such as feature positioning, one or more feature dimensions, and some indication of a moiety at a given location. "Hybridizing" and "binding", with respect to polynucleotides, are used interchangeably.

When one item is indicated as being "remote" from another, this is referenced that the two items are at least in different buildings, and may be at least one mile, ten miles, or at least one hundred miles apart. "Communicating" information references transmitting the data representing that information over a suitable communication channel (for example, a private or public network). "Forwarding" an item refers to any means of getting that item from one location to the next, whether by physically transporting that item and includes, at least in the case of data, physically transporting a medium carrying the data or communicating the data. An array "package" may be the array plus only a substrate on which the array is deposited, although the package may include other features (such as a housing with a chamber). It will also be appreciated that throughout the present application, that words such as "top", "upper", and "lower" are used in a relative sense only. "Fluid" is used herein to reference a liquid. A "set" or a "sub-set" may have one or more members (for example, one or more droplets). All pressures are relative, with pressures inside the chamber normally being referenced to ambient pressure immediately outside the chamber orifice. Reference to a singular item, includes the possibility that there are plural of the same items present. All patents and other cited references are incorporated into this application by reference.

Figure 1:
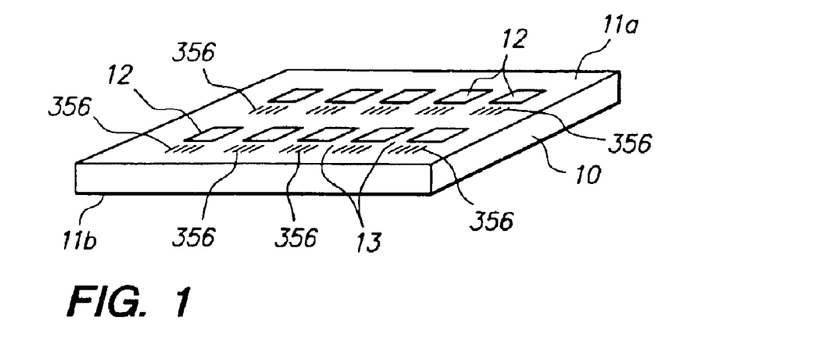
FIG. 1 illustrates a substrate carrying multiple arrays, such as may be fabricated using an apparatus and a method of the present invention.
Figure 2:
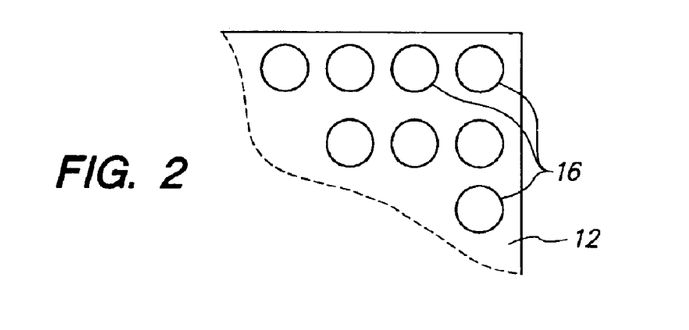
FIG. 2 is an enlarged view of a portion of FIG. 1 showing multiple ideal spots or features.
Figure 3:
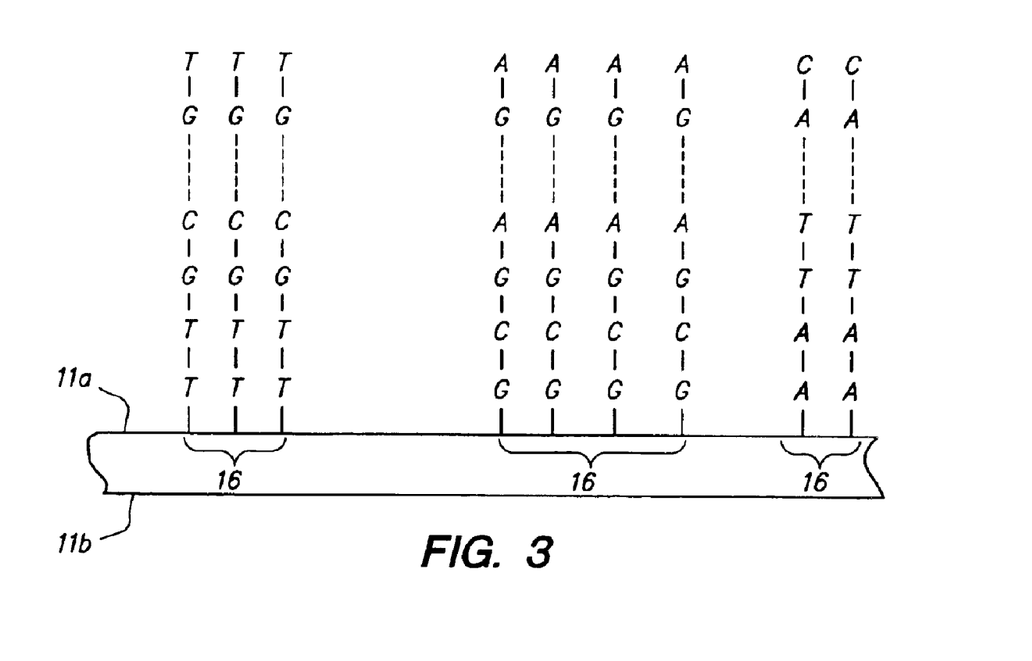
FIG. 3 is an enlarged illustration of a portion of the substrate in FIG. 2.

Referring first to FIGS. 1–3, typically methods and apparatus of the present invention fabricate a contiguous planar substrate 10 carrying one or more arrays 12 disposed across a front surface 11a of substrate 10 and separated by inter-array areas 13. A back side 11b of substrate 10 does not carry any arrays 12. The arrays on substrate 10 can be designed for testing against any type of sample, whether a trial sample, reference sample, a combination of them, or a known mixture of polynucleotides (in which latter case the arrays may be composed of features carrying unknown sequences to be evaluated). Each array 12 may have associated with it a unique identification in the form of a bar code 356. While ten arrays 12 are shown in FIG. 1, it will be understood that substrate 10 and the embodiments to be used with it, may use any number of desired arrays 12. Similarly, substrate 10 may be of any shape, and any apparatus used with it adapted accordingly. Depending upon intended use, any or all of arrays 12 may be the same or different from one another and each will contain multiple spots or features 16 of biopolymers in the form of polynucleotides. A typical array may contain from more than ten, more than one hundred, more than one thousand or ten thousand features, or even more than from one hundred thousand features. All of the features 16 may be different, or some or all could be the same. In the embodiment illustrated, there are interfeature areas 17 between features, which do not carry any polynucleotide. It will be appreciated that the interfeature areas 17 could be of various sizes and configurations or may not be present at all. However, in the case where arrays 12 are formed by depositing for each feature one or more droplets of a reagent such as by using a pulse jet such as an inkjet type head, interfeature areas 17 will typically be present. It will also be appreciated that there need not be any space separating arrays 12 from one another. Each feature carries a predetermined polynucleotide (which includes the possibility of mixtures of polynucleotides). As per usual, A, C, G, T represent the usual nucleotides. It will be understood that there is usually a linker molecule (not shown) of any known types between the front surface 11a and the first nucleotide.

FIGS. 2 and 3 illustrate ideal features where the actual features formed are the same as the target (or "aim") features, with each feature 16 being uniform in shape, size and composition, and the features being regularly spaced. Fabricating such an ideal array would require all reagent droplets for each feature to be uniform in shape and volume and accurately deposited at the target feature location. In practice such an ideal result is difficult to obtain particularly if air bubbles are present in the fluid being deposited from a drop dispenser.

Figure 4:
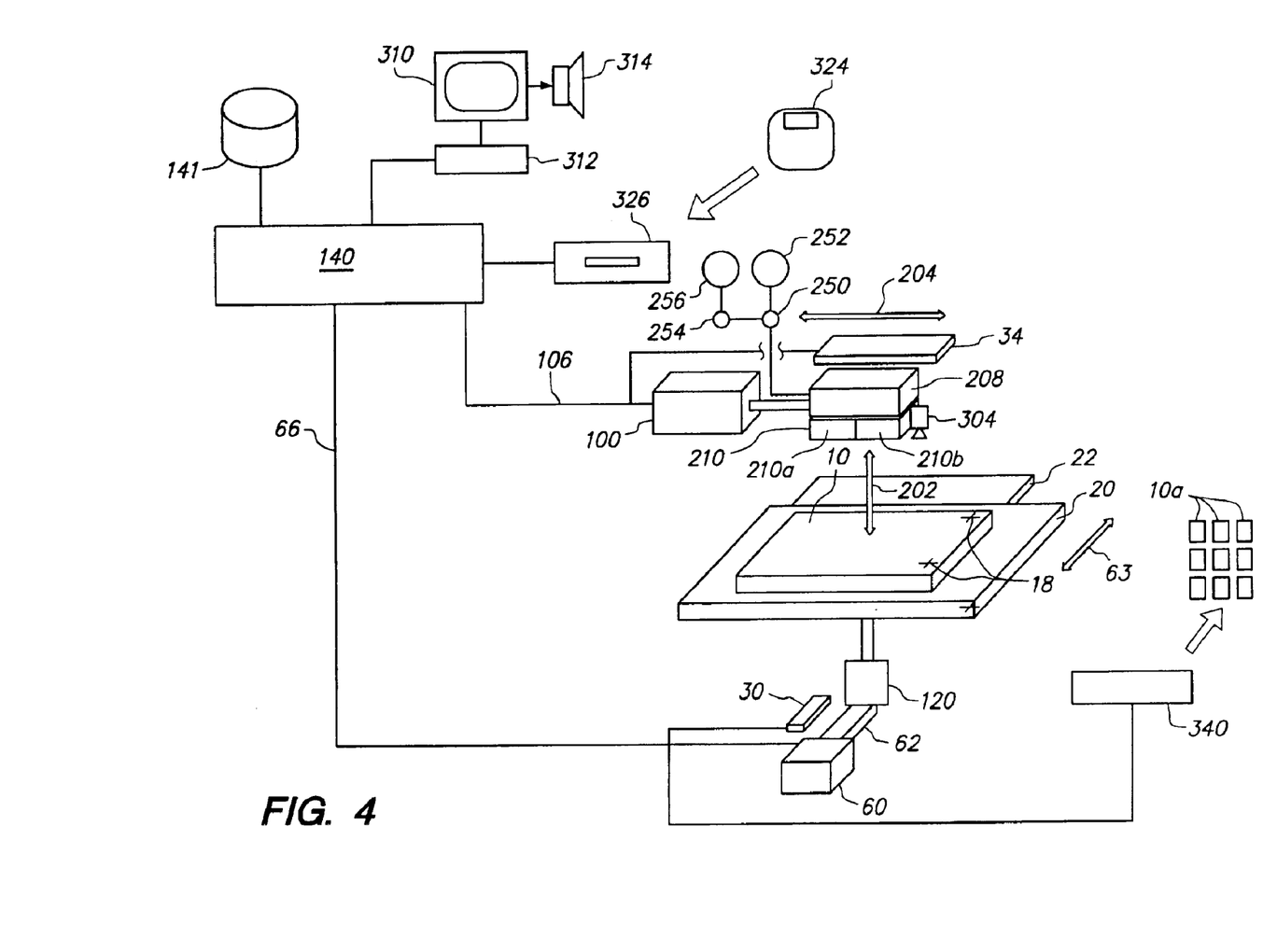
FIG. 4 illustrates an apparatus of the present invention.

Referring to FIG. 4 an apparatus of the present invention includes a substrate station 20 on which can be mounted a substrate 10. Pins or similar means (not shown) can be provided on substrate station 20 by which to approximately align substrate 10 to a nominal position thereon. Substrate station 20 can include a vacuum chuck connected to a suitable vacuum source (not shown) to retain a substrate 10 without exerting too much pressure thereon, since substrate 10 is often made of glass.

Dispensing head system 210 is retained by a head retainer 208. Head system 210 can be positioned at any position facing substrate 20 or a load station 22 (described below), by means of a transport system. Other stations can be present and be used as described in more detail in U.S. patent application Ser. No. 09/302,922 entitled "Fabricating Biopolymer Arrays" by Webb et al., incorporated herein by reference. The transport system includes a carriage 62 connected to a first transporter 60 controlled by processor 140 through line 66, and a second transporter 100 controlled by processor 140 through line 106. Transporter 60 and carriage 62 are used execute one axis positioning of station 20 (and hence mounted substrate 10) facing the dispensing head system 210, by moving it in the direction of nominal axis 63, while transporter 100 is used to provide adjustment of the position of head retainer 208 in a direction of nominal axis 204 (and hence move the rows of dispensers as described in connection with FIGS. 4 and 5). In this manner, head system 210 can be scanned line by line, by scanning along a line over substrate 10 in the direction of axis 204 using transporter 100, while line by line movement of substrate 10 in a direction of axis 63 is provided by transporter 60. Head system 210 may also optionally be moved in a vertical direction 202, by another suitable transporter (not shown). However, it will be appreciated that other scanning configurations could be used. However, it will be appreciated that both transporters 60 and 100, or either one of them, with suitable construction, could be used to perform the foregoing scanning of head system 210 with respect to substrate 10. Thus, when the present application refers to "positioning" one element (such as head system 210) in relation to another element (such as one of the stations 20 or substrate 10) it will be understood that any required moving can be accomplished by moving either element or a combination of both of them. An encoder 30 communicates with processor 140 to provide data on the exact location of substrate station 20 (and hence substrate 10 if positioned correctly on substrate station 20), while encoder 34 provides data on the exact location of holder 208 (and hence head system 210 if positioned correctly on holder 208). Any suitable encoder, such as an optical encoder, may be used which provides data on linear position. Angular positioning of substrate station 20 is provided by a transporter 120, which can rotate substrate station 20 about axis 202 under control of processor 140. Typically, substrate station 20 (and hence a mounted substrate) is rotated by transporter 120 under control of processor 140 in response to an observed angular position of substrate 10 as determined by processor 140 through viewing one or more fiducial marks on substrate 10 (particularly fiducial marks 18) with a camera (not shown). This rotation will continue until substrate 10 has reached a predetermined angular relationship with respect to dispensing head system 210. In the case of a square or rectangular substrate, the mounted substrate 10 will typically be rotated to align one edge (length or width) with the scan direction of head system 210 along axis 204.

Holder 208 (and hence dispensing head 210) is in communication with a positive pressure supply 252 through a proportional valve 250 under the control of processor 140 (through a suitable communication line, not shown). Pressure supply 252 and valve 250 together act as components of a pressure source which can provide a prime pressure under control of processor 140. Pressure supply 152 may, for example, be a positive pressure supply such as a pressurized supply of anhydrous nitrogen. However, pressure supply 152 could alternatively provide a negative pressure (that is, the prime pressure could vary over a range which is, at least in part, less than ambient pressure) or provide both a positive and negative pressure (that is, the prime pressure could vary over a range which is greater and less than ambient pressure). The prime pressure is varied by processor 140 opening proportional valve 250 to varying degrees. Holder 208 (and hence dispensing head 210) is also in communication with a negative pressure supply 256 (such as a vacuum tank) through a proportional valve 254 also under the control of processor 140 (through a suitable communication line, not shown). Pressure supply 256 and valve 254 together act as further components of the pressure source, to provide a loading pressure under control of processor 140. Normally, for a given apparatus the loading pressure will be a fixed value such that during each loading cycle of head 210 the same loading pressure is applied. Proportional valve 254 allows this fixed value to be readily set during an initial set-up of the apparatus. All of the foregoing pressures are measured relative to ambient pressure just outside the pulse jet orifices.

Figure 5A:
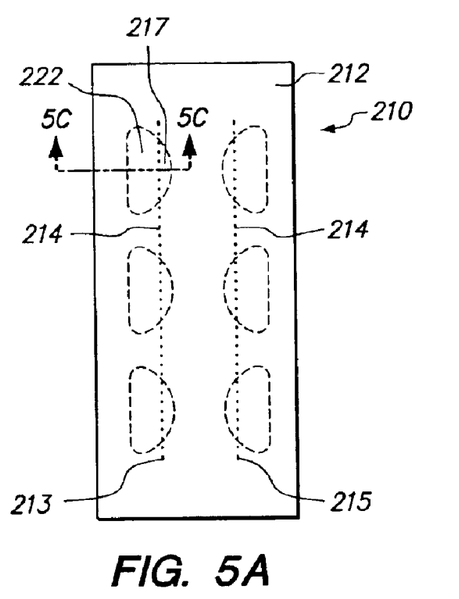
FIG. 5A is a top view of a fluid dispensing head used in an apparatus of the present invention.
Figure 5B:
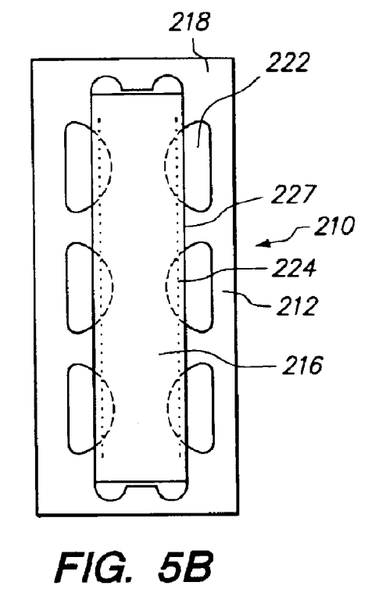
FIG. 5B is a bottom view of the head of FIG. 5A.
Figure 5C:
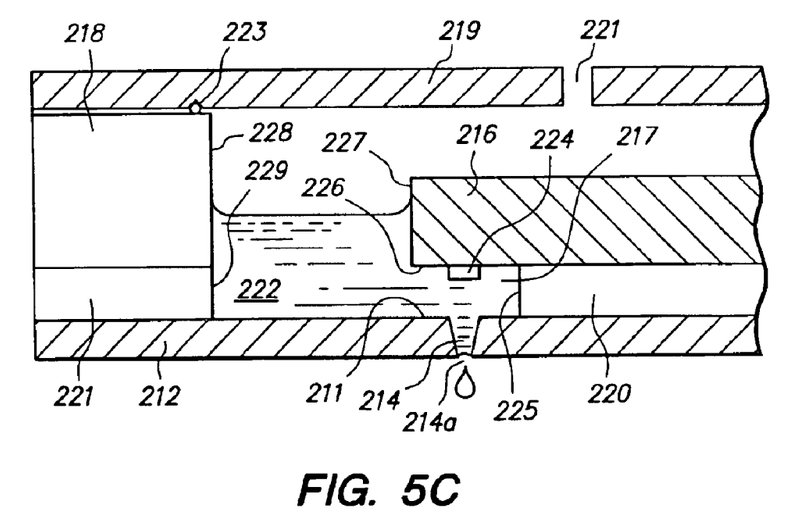
FIG. 5C is a cross-section along the line 5C—5C in FIG. 5A.

Referring now to FIGS. 5A to 5C, these show in plan view a particular fluid dispensing head 210 of the apparatus of FIG 4. Head 210 has multiple fluid dispensing jets, and six reservoir chambers 222 and three hundred capillary delivery chambers 217. An orifice member 212 (here an orifice plate) represents a front face of head 210, and has orifices 214 disposed in two orifice rows 213, 215. Each orifice 214 can be regarded as part of a delivery chamber 217, and tapers inwardly away from a delivery chamber 217 toward an open end 214a of the orifice 214. Prototypes having this configuration were constructed having 150 orifices in each of the orifice rows. Thus, while each fluid pulse jet includes a fluid dispensing chamber 217, an ejector 224 as described below, and a reservoir chamber 222, the six reservoir chambers 222 are shared among a number of delivery chambers 217 (that is, each reservoir chamber 222 has multiple delivery chambers 217), while each pulse jet, of course, has its own ejector 224. It will be appreciated that the number of orifices and corresponding ejectors could of course be varied, for example between 1 or 10 to 300 or to 500 or more, depending upon their size and materials used to construct head 210. Rearward of orifice member 212 are barrier 220 and adhesive 221, and, resting upon adhesive 221 is reservoir block 218 and resting upon barrier 220 is back member 216 (here a silicon die, as described more fully below), all more readily understood with reference to a rear view as in FIG. 5B and to a sectional view as in FIG. 5C.

In a particular configuration, the barrier 220 is a photo polymer layer, and accordingly the delivery chambers (for example delivery chambers 217) are defined in part by the inner surface 211 of the orifice plate 212, in part by the front surface of the margin (for example surface 226) of the back member 216, and in part by an edge (for example edge 225) of the portion of the photo polymer layer 220 situated between the orifice plate and the back member. And, in such a configuration, the reservoirs (for example reservoir 222), which are not separate from the delivery chambers, are defined in part by a portion of an edge of the back member (for example edge portion 227), and in part by an inner wall (for example wall 228) of the reservoir block 218 together with an edge (for example edge 229) of the adhesive layer, situated partly between the reservoir block 218 and the orifice plate 212.

A cover 219 (removed in FIG. 5B; shown in sectional view in FIG. 5C) is affixed to the rear surface of the reservoir block 218, and sealed peripherally (for example by means of an "O" ring 223) so that it provides a common enclosure for the reservoirs. Cover 219 is provided with a port 221, permits communication with holder 208 and hence with valves 250, 254 and respective pressure supplies 252, 256. As will be appreciated, the delivery chambers and reservoirs of the device of FIGS. 5A to 5C can be filled with fluid (that is, the pulse jets can be "loaded") by contacting the exit ends of the orifices with a quantity of the fluid at loading station 22, and then providing a loading pressure to head 210 by opening valve 254 to the negative pressure in pressure supply 256. The loading pressure is sufficient such that the fluid is drawn into the chambers through the orifices. Selected different fluids (for example, different types of biopolymers or biopolymers of the same type but of different monomer sequence) can be drawn into the different chambers and reservoirs by contacting each orifice group (in fluid communication with a delivery chamber) with different fluids at loading station 22. Preferably, the loading pressure is sufficiently negative such that the fluid is drawn into the reservoir chamber 222 through the delivery chamber 217 while simultaneously being insufficient to result in ambient atmosphere entering the delivery through an orifice when no further fluid is facing and adjacent the orifice (typically when a drop of liquid to be loaded, has been completely loaded). Otherwise, fluid being loaded into a jet through an orifice would be drawn into delivery chambers 217 with possible loss of prime of the jets. That is, the delivery chambers 217 should be completely filled (and preferably along with at least part of reservoir chambers 222), with a liquid face or meniscus being maintained within orifice 214 and preferably at the open end 214a of the orifices 214. Air entering orifices 214 after loading may result in loss of this condition.

Similarly, the one or more cycles of the varying prime pressure can be delivered to head 210 through valve 250 from pressure source 252. As mentioned, the prime pressure varies over a range sufficient to move fluid within the drop dispenser but insufficient to cause fluid to be dispensed from the orifice. This movement of the loaded fluid can help to dislodge small bubbles trapped in the fluid loaded within the chamber while not causing loss of loaded fluid (which may be expensive or difficult to replace) out through an orifice. The varying prime pressure, may for example, cover a pressure range (as measured by a water column height relative to ambient pressure immediately outside the orifices) anywhere between plus 50 cm to minus 50 cm (for example plus or minus X cm to 0 cm, or between plus X to minus X), where X is 100, 50, or 5 (for example, 35). These pressures are dependent on fluid surface tension and chamber capillarity and head material characteristics. Preferably, neither of the loading pressure nor the maximum or minimum prime pressure (should exceed the capillary pressure in head 210). Either of the loading and prime pressures may be calculated based on the fluid to be loaded and capillary effects in head 210, or either can be determined experimentally for a given apparatus during the initial apparatus set-up. For example, the prime pressure can be calculated as being less than the capillary strength of the orifice. In another example, in the case of prime pressure, the positive pressure delivered to head 210 through valve 250 can be increased until loaded fluid is dispensed through an orifice. Similarly, the negative pressure delivered to head 210 through valve 254 can be decreased until air is drawn in through orifices in a fluid loaded head 210. These values define values which are just beyond the maximum and minimum pressures of the varying prime pressure for the given apparatus. Similarly, the duration of a prime pressure cycle can be determined experimentally for a given apparatus by observing dispensed drops for consistency in shape and size. Typical rates may vary between about 0.1 to 100 cycles/second, or 1 to 10 or 20 cycles/second, or between 0.5 to 2 cycles/second.

Opposite each orifice 214 on the front surface 226 of the margin of the back member is an ejector 224 (here a piezoelectric element or an electrical resistor operating as a heating element), which is electrically connected to processor 140 which delivers a suitable pulse of electricity to activate the ejector as required. In a particular embodiment the back member is a silicon die, and the electrical parts (heating element and connectors, for example) are formed using conventional solid state silicon ship manufacturing techniques.

The various fluid-handling parts of the head 210 generally have the following characteristics. The size of each orifice in the orifice plate is one that produces a spot of suitable dimensions on the substrate surface, where the orifice generally has an exit diameter (or exit diagonal depending upon the particular format of the device) in the range about 1 $\mu$m to 1 mm, usually about 5 $\mu$m to 100 $\mu$m, and more usually about 10 $\mu$m to 60 $\mu$m. The fluid capacity of the delivery chamber is in the range about 1 pL to 10 nL, usually about 10 pL to 5 nL and more usually about 50 pL to 1.5 nL. The reservoir chamber 222 and the connected delivery chamber 217, with which any one of the orifices 214 communicate, together have a combined fluid capacity in the range about 1 pL up to 1 mL (more typically less than 100 $\mu$L), usually about 0.5 $\mu$L to 10 $\mu$L, and more usually about 1 $\mu$L to 5 $\mu$L. The front-to-rear thickness of the delivery chamber, defined by the space between the rear surface of the orifice plate and the front surface of the margin of the back plate, may in some embodiments be in the range less than about 100 $\mu$m, for example in prototypes of embodiments shown in the Figures herein, in the range 10 $\mu$m to 60 $\mu$m.

Where the ejector is a heating element, the heating element will preferably be made out of a material that can deliver a quick energy pulse, and suitable materials include TaAl and the like. The thermal element is capable of achieving temperatures sufficient to vaporize a sufficient volume of the fluid in the firing chamber to produce a bubble of suitable dimensions upon actuation of the ejector. Generally, the heating element is capable of attaining temperatures at least about 100° C., usually at least about 400° C., and more usually at least about 700° C., and the temperature achievable by the heating element may be as high as 1000° C. or higher. It will be appreciated of course, that other ejector types, such as piezoelectric ejectors, could be used instead of a heating element.

A device as in FIGS. 5A to 5C can be constructed by adaptation of techniques known in the printing art and, particularly, in the art of inkjet device construction. Certain elements of the device of FIGS. 5A to 5C can be adapted from parts of a commercially available thermal inkjet print head device available from Hewlett-Packard Co. as part no. HP51645A. Various other dispensing head designs can be used, such as those described in U.S. patent application entitled "A MULTIPLE RESERVOIR INK JET DEVICE FOR THE FABRICATION OF BIOMOLECULAR ARRAYS" Ser. No. 09/150,507 filed Sep. 9, 1998. That reference and all other references cited in the present application are incorporated herein by reference.

It should be noted that the above dimensions of the head 210, and particularly the dimensions of the deliver chamber 217 (and included orifices 214) are small enough that capillary forces can have a significant effect on the fluid pressures within the fluid column contained within these and larger fluid-handling parts. Particularly, each orifice 214 and connected capillary delivery chamber 217 are so dimensioned that they can be expected to fill by capillary action when the orifice 214 is brought into contact with the meniscus of a liquid to be loaded into the pulse jet, at loading station 22. Reservoir chamber 222 is also capillary but it may be non-capillary (by non-capillary is meant that it is so dimensioned that it will not fill by capillary action after delivery chamber 217 has completely filled). While reservoir chamber 222 is capillary it is distinguishable from the delivery chamber 217. However, reservoir chamber 222 could be dimensioned such that it is indistinguishable from delivery chamber 217 (in which case the reservoir and delivery chambers may be the same chamber).

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The sizes of the features can have widths (that is, diameter, for a round spot) in the range from a minimum of about 10 μm to a maximum of about 1.0 cm. In embodiments where very small spot sizes or feature sizes are desired, material can be deposited according to the invention in small spots whose width is in the range about 1.0 μm to 1.0 mm, usually about 5.0 μm to 500 μm, and more usually about 10 μm to 200 μm. Spot sizes can be adjusted as desired, by using one or a desired number of pulses from a pulse jet to provide the desired final spot size.

Multiple pulse jets of head 210 can be simultaneously loaded through orifices of the pulse jets at a loading station 22. The loading station may have multiple receptacles to retain multiple different fluids such that the dispensers can be simultaneously brought into contact with respective receptacles for loading the dispensers with the different fluids. Such a loading station 22 may include a flexible microtitre plate as described in U.S. patent application "Method and Apparatus for Liquid Transfer", Ser. No. 09/183,604, incorporated herein by reference. The transport system can also move head 210 to such a loading station, as required, with the orifices of the pulse jets facing the transport system such that they can be brought into contact with biopolymer containing fluid in the manner described in more detail in the foregoing application.

The apparatus optionally may optionally include a sensor in the form of a camera 304, to monitor for other errors (such as failure to dispense droplets) by monitoring for drops dispensed onto substrate 10 when required of a dispenser. Camera 304 communicates with processor 140, and should have a resolution that provides a pixel size of about 1 to 100 micrometers and more typically about 4 to 20 micrometers or even 1 to 5 micrometers. Any suitable analog or digital image capture device (including a line by line scanner) can be used for such camera, although if an analog camera is used processor 140 should include a suitable analog/digital converter. A detailed arrangement and use of such a camera to monitor for dispenser errors, is described in U.S. patent application Ser. No. 09/419447 entitled "Biopolymer Array Inspection" by William D. Fisher. Particular observations techniques are described, for example, in co-pending U.S. patent application Ser. No. 09/302,898 filed Apr. 30, 1999 by Caren et al., assigned to the same assignee as the present application, incorporated herein by reference. Alternatively, the sensor can be a drop detector which detects an electrical charge on a dispensed drop, in accordance with the apparatus and methods described in U.S. Ser. No. 09/558,532 entitled "Array Fabrication with Drop Detection" filed by Christopher A. Schantz et al. Monitoring can occur during formation of an array and the information used during fabrication of the remainder of that array or another array, or test-print patterns can be run before array fabrication.

A display 310, speaker 314, and operator input device 312, are further provided. Operator input device 312 may, for example, be a keyboard, mouse, or the like. Processor 140 has access to a memory 141, and controls print head system 210 (specifically, the activation of the ejectors therein), operation of the transport system, operation of each jet in print head system 210, capture and evaluation of images from the camera 304, and operation display 310 and speaker 314. Memory 141 may be any suitable device in which processor 140 can store and retrieve data, such as magnetic, optical, or solid state storage devices (including magnetic or optical disks or tape or RAM, or any other suitable device, either fixed or portable). Processor 140 may include a general purpose digital microprocessor suitably programmed from a computer readable medium carrying necessary program code, to execute all of the functions required of it as described below. It will be appreciated though, that when a "processor" such as processor 140 is referenced throughout this application, that such includes any hardware and/or software combination which will perform the required functions. Suitable programming can be provided remotely to processor 140, or previously saved in a computer program product such as memory 141 or some other portable or fixed computer readable storage medium using any of those devices mentioned below in connection with memory 141. For example, a magnetic or optical disk 324 may carry the programming, and can be read by disk reader 326. A cutter 340 is provided which under control of processor 140 can separate substrate 10 by cutting it, into multiple equal sized substrate segments 10a each carrying at least one array 12.

Operation of the apparatus of FIG. 4 in accordance with a method of the present invention, will now be described. First, it will be assumed that memory 141 holds a target drive pattern. This target drive pattern is the instructions for driving the apparatus components as required to form the target array (which includes target locations and dimension for each spot) on substrate 10 and includes, for example, movement commands to transporters 60 and 100 as well as firing commands for each of the pulse jets in head system 210 co-ordinated with the movement of head system 210 and substrate 10, as well as instructions for which polynucleotide solution (or precursor) is to be loaded from load station 22 into each pulse jet (that is, the "loading pattern"). This target drive pattern is based upon the target array pattern and can have either been input from an appropriate source (such as input device 312, a portable magnetic or optical medium, or from a remote server, any of which communicate with processor 140), or may have been determined by processor 140 based upon an input target array pattern (using any of the appropriate sources previously mentioned) and the previously known nominal operating parameters of the apparatus. Further, it will be assumed that drops of different biomonomer or biopolymer containing fluids (or other fluids) have been placed at respective regions of a loading station (not shown). Operation of the following sequences are automatically controlled by processor 140, following initial operator activation, unless a contrary indication appears.

For any given substrate 10, the operation of the present method is basically follows. A target drive pattern is determined (if not already provided) to obtain a target array pattern, based on nominal operating parameters and target polynucleotide array pattern. The target array pattern may include the possibility of multiple arrays 12 on the same substrate 10, as discussed above in connection with FIGS. 1–3, and includes the forming of sets of neighboring features in the manner already described above. The apparatus is then operated as follows: (a) position head system 210 at load station 22 with head orifices adjacent and facing a first set of respective biomonomer or biopolymer containing fluids retained on load station 22, and provide a load pressure to the chamber which is sufficient such that the first set of fluids is drawn into the chamber through the orifices; (b) reposition head 210 to face substrate 10 and dispense multiple droplets from head system 210 onto substrate 10 or multiple different substrates 10, in accordance with at least a portion of the target drive pattern; and (c) reload head 210 at the loading station and repeat steps (a) and (b) in multiple cycles as necessary until drops of all required solutions have been dispensed onto substrate 10 so as to form the one or more arrays 12. In addition, the varying prime pressure is applied at any time following the loading and prior to the dispensing during each cycle.

A loading sequence for head system 210 is more completely described in co-pending patent applications "FABRICATING BIOPOLYMER ARRAYS", by Caren et al., Ser. No. 09/302,922, and "PREPARATION OF BIOPOLYMER ARRAYS" by A. Schleifer et al., Ser. No. 09/302,899, both filed Apr. 30, 1999 and both assigned to the same assignee as the present application, and the references cited therein, including the possibility of using a flexible microtitre plate as mentioned above. Those references and all other references cited in the present application, are incorporated into this application by reference. Processor 140 can control valves 250, 254 to thereby control pressure within head system 210 to provide the loading and prime pressures as required during each head loading cycle.

Substrate 10 is loaded onto substrate station 20 either manually by an operator, or optionally by a suitable automated driver (not shown) controlled, for example, by processor 140.

The deposition sequence is then initiated to deposit the desired arrays of polynucleotide containing fluid droplets on the substrate according to the target pattern to form the arrays each with respective feature locations and dimensions. As already mentioned, in this sequence processor 140 will operate the apparatus according to the target drive pattern, by causing the transport system to position head system 210 facing substrate station 20, and particularly the mounted substrate 10, and with head system 210 at an appropriate distance from substrate 10. Processor 140 then causes the transport system to scan head system 210 across substrate 10 line by line (or in some other desired pattern), while co-ordinating activation of the ejectors in head system 210 so as to dispense droplets as described above. As already mentioned, if necessary or desired, processor 140 can repeat the loading and dispensing sequences one or more times until head system 210 has dispensed droplets to obtain the target arrays 12 on substrate 10. The number of spots in any one array 12 can, for example, be at least ten, at least one hundred, at least one thousand, or even at least one hundred thousand.

At this point the droplet dispensing sequence is complete. Substrate 10 can then be sent to cutter 340 and cut into separate segments 10a, each carrying at least one array 12.

When a user receives an array made by an apparatus or method of the present invention, it will typically be exposed to a sample and the array read following exposure. Reading is usually accomplished by a suitable scanner which can read the location and intensity of fluorescence at each feature of an array following exposure to a fluorescently labeled sample (such as a polynucleotide containing sample). For example, such a scanner may be similar to the GENERALLY scanner available from Agilent, Palo Alto, Calif. Results from the reading can be processed results such as obtained by rejecting a reading for a feature which is below a predetermined threshold and/or forming conclusions based on the pattern read from the array (such as whether or not a particular target sequence may have been present in the sample). The results of the array reading (whether processed or not) can be forwarded (such as by communication) to a remote location if desired, where it is received for further use.

Modifications in the particular embodiments described above are, of course, possible. For example, where a pattern of arrays is desired, any of a variety of geometries may be constructed other than the organized rows and columns of arrays 12 of FIG. 1. For example, arrays 12 can be arranged in a series of curvilinear rows across the substrate surface (for example, a series of concentric circles or semi-circles of spots), and the like. Similarly, the pattern of regions 16 may be varied from the organized rows and columns of spots in FIG. 2 to include, for example, a series of curvilinear rows across the substrate surface(for example, a series of concentric circles or semi-circles of spots), and the like. Even irregular arrangements of the arrays or the regions within them can be used, when some means is provided to an end user to identify the composition of nature of features at respective addresses.

The present methods and apparatus may be used to deposit previously obtained biopolymers, or biomonomers during an in situ fabrication process, or other moieties on surfaces of any of a variety of different substrates, including both flexible and rigid substrates. Preferred materials provide physical support for the deposited material and endure the conditions of the deposition process and of any subsequent treatment or handling or processing that may be encountered in the use of the particular array. The array substrate may take any of a variety of configurations ranging from simple to complex. Thus, the substrate could have generally planar form, as for example a slide or plate configuration, such as a rectangular or square or disc. In many embodiments, the substrate will be shaped generally as a rectangular solid, having a length or width in the range about 4 mm to 1 m, or about 4 mm to 500 cm, or about 4 mm to 200 cm (or to 50 cm; and a thickness in the range about 0.01 mm to 5.0 mm, usually from about 0.1 mm to 2 mm and more usually from about 0.2 to 1 mm. However, any sized substrates can be used, particularly very large substrate may be used when such are cut after fabrication into smaller size substrates carrying a smaller total number of arrays 12. Substrates of other configurations and equivalent areas can be chosen. The configuration of the array may be selected according to manufacturing, handling, and use considerations.

The substrates may be fabricated from any of a variety of materials. In certain embodiments, such as for example where production of binding pair arrays for use in research and related applications is desired, the materials from which the substrate may be fabricated should ideally exhibit a low level of non-specific binding during hybridization events. In many situations, it will also be preferable to employ a material that is transparent to visible and/or UV light. For flexible substrates, materials of interest include: nylon, both modified and unmodified, nitrocellulose, polypropylene, and the like, where a nylon membrane, as well as derivatives thereof, may be particularly useful in this embodiment. For rigid substrates, specific materials of interest include: glass; fused silica, silicon, plastics (for example, polytetrafluoroethylene, polypropylene, polystyrene, polycarbonate, and blends thereof, and the like); metals (for example, gold, platinum, and the like).

The substrate surface onto which the polynucleotide compositions or other moieties is deposited may be porous or non-porous, smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated), Various further modifications to the particular embodiments described above are, of course, possible. Accordingly, the present invention is not limited to the particular embodiments described in detail above.

What is claimed is:

1. An apparatus for fabricating an array of biopolymers on a substrate using a biopolymer or biomonomer fluid, comprising:
    (a) a substrate station on which the substrate can be mounted;
    (b) a drop dispenser having a chamber to receive and retain fluid loaded into the chamber, and an orifice communicating therewith from which loaded fluid is dispensed; and
    (c) a pressure source to apply a varying prime pressure to fluid after it has been loaded in the chamber, which pressure is sufficient to move fluid within the drop dispenser but insufficient to cause fluid to be dispensed from the orifice.

2. An apparatus according to claim 1 wherein the pressure source, when activated, automatically applies the varying prime pressure in at least one cycle between higher and lower pressures.

3. An apparatus according to claim 2 wherein the pressure source, when activated, automatically applies multiple cycles of the varying prime pressure.

4. An apparatus according to claim 3 wherein the duration of each cycle is between 0.01 to 5 seconds.

5. An apparatus according to claim 3 wherein the duration of each cycle is between 0.1 to 1 seconds.

6. An apparatus according to claim 1 wherein the drop dispenser is a drop dispensing jet which includes the chamber and an ejector which, when activated, causes a droplet to be ejected from the orifice.

7. An apparatus according to claim 6 wherein the ejector is a piezoelectric ejector.

8. An apparatus according to claim 6 wherein the ejector is a thermal ejector.

9. A apparatus according to claim 3 wherein the varying prime pressure reaches a value during a cycle which is greater than ambient pressure outside the orifice.

10. A apparatus according to claim 3 wherein the varying prime pressure reaches a value during a cycle which is less than ambient pressure outside the orifice.

11. An apparatus according to claim 2 additionally comprising:
    a load station to receive at least one fluid sample for loading into the dispenser; and
    a transport system to selectively position the head facing any one of the stations;
    and wherein the pressure source can also provide a load pressure to the chamber which is sufficient such that the fluid is drawn into the chamber through the orifice.

12. An apparatus according to claim 11 additionally comprising a processor which directs the transport system to selectively position the head facing the load station or substrate station, and which directs the pressure source to provide the load pressure when the head is facing the load station and to provide the varying prime pressure after the head has been loaded.

13. An apparatus according to claim 2 wherein the orifice has an are of between 1 $\mu m^2$ to 3 $mm^2$.

14. An apparatus according to claim 2 wherein the orifice has an area of between 30 $\mu m^2$ to 900 $\mu m^2$.

15. An apparatus according to claim 2 wherein the fluid capacity of the chamber is in the range about 1 pL to 10 nL.

16. A computer program product comprising a computer readable storage medium carrying computer readable program code, for use with an apparatus for fabricating an array on a substrate and which has a substrate station on which the substrate can be mounted, a drop dispenser having a chamber to receive and retain fluid loaded into the chamber and an orifice communicating with the chamber and from which loaded fluid is dispensed, and a pressure source, the program code when loaded into a computer of the apparatus causing the apparatus to:
    (a) apply a prime pressure from the pressure source to fluid in a fluid loaded chamber, which prime pressure varies over a range sufficient to move fluid within the drop dispenser but insufficient to cause fluid to be dispensed from the orifice; and
    (b) dispense drops from the dispenser to the substrate so as to form the array.

17. A computer program product according to claim 16 wherein the varying prime pressure is cycled at least once between higher and lower pressures.

18. A computer program product according to claim 17 wherein the varying prime pressure is cycled multiple times between higher arid lower pressures.

19. A computer program product according to claim 17 wherein the duration of each cycle is between 0.01 to 5 seconds.

20. A computer program product according to claim 17 wherein the program additional causes the apparatus to:
    load the dispenser by positioning the orifice adjacent and facing a biomonomer or biopolymer containing fluid, and providing a load pressure to the chamber which is sufficient such that the fluid is drawn into the chamber through the orifice;
    positioning the head with the orifice facing the substrate; and
    dispensing multiple drops from the head so as to form an array of droplets on the substrate;
    wherein the varying prime pressure is applied following the loading and prior to the dispensing.

* * * * *